United States Patent
Soubaras et al.

(10) Patent No.: US 9,329,290 B2
(45) Date of Patent: *May 3, 2016

(54) 3-D HARMONIC-SOURCE REVERSE TIME MIGRATION SYSTEMS AND METHODS FOR SEISMIC DATA ANALYSIS

(71) Applicant: CGG Services SA, Massy Cedex (FR)

(72) Inventors: Robert Soubaras, Orsay (FR); Yu Zhang, Katy, TX (US)

(73) Assignee: CGGVERITAS SERVICES SA, Massy (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/516,724

(22) Filed: Oct. 17, 2014

(65) Prior Publication Data

US 2015/0036461 A1 Feb. 5, 2015

Related U.S. Application Data

(63) Continuation of application No. 13/190,758, filed on Jul. 26, 2011, now Pat. No. 8,879,355.

(60) Provisional application No. 61/368,456, filed on Jul. 28, 2010.

(51) Int. Cl.
*G01V 1/28* (2006.01)
*G01V 1/36* (2006.01)
*G01V 1/34* (2006.01)

(52) U.S. Cl.
CPC ............... *G01V 1/345* (2013.01); *G01V 1/282* (2013.01); *G01V 2210/51* (2013.01); *G01V 2210/675* (2013.01); *G01V 2210/679* (2013.01); *G01V 2210/74* (2013.01)

(58) Field of Classification Search
CPC .............. G01V 1/282; G01V 2210/51; G01V 2210/679; G01V 1/345; G01V 2210/675
USPC .................................. 367/38, 50–53; 702/16
See application file for complete search history.

(56) References Cited

U.S. PATENT DOCUMENTS 7,599,798 B2  10/2009  Beasley et al.
7,768,871 B2   8/2010  Soubaras
(Continued)

FOREIGN PATENT DOCUMENTS

WO     2010014379 A2    2/2010

OTHER PUBLICATIONS

Soubaras, "Modulated-shot migration", SEG Annual Meeting, Oct. 1-6, 2006, New Orleans, pp. 2430-2434.
(Continued)

*Primary Examiner* — Ian J Lobo
(74) *Attorney, Agent, or Firm* — Patent Portfolio Builders PLLC

(57) ABSTRACT

Computing device and method for processing seismic traces to produce an image of a subsurface area. The method includes receiving a series of seismic traces related to the subsurface area and recorded by one or more seismic receivers, wherein the one or more seismic sources are originally generated by a source; applying a phase encoding function to the series of seismic traces, at least a portion of said seismic traces comprise signals reflected by geological interfaces of the subsurface area; applying a 3 dimensional (3D) harmonic-source reverse time migration of the series of seismic traces encoded with the phase encoding function; computing a forward wavefield by solving a first wave equation; computing a backward wavefield by solving a second wave equation; and cross-correlating the forward wavefield with the backward wavefield to generate an image of the subsurface.

20 Claims, 5 Drawing Sheets

(56) References Cited

U.S. PATENT DOCUMENTS

| | | | |
|---|---|---|---|
| 8,879,355 B2* | 11/2014 | Soubaras et al. | 367/50 |
| 2009/0306900 A1* | 12/2009 | Jing et al. | 702/13 |
| 2010/0054082 A1 | 3/2010 | McGarry et al. | |
| 2010/0118651 A1 | 5/2010 | Liu et al. | |

OTHER PUBLICATIONS

Zhang et al., "Delayed-shot 3D depth migration", Geophysics, Sep.-Oct. 2005, pp. E21-E28, vol. 70, No. 5.

Zhang et al., "Practical issues of reverse time migration: true-amplitude gathers, noise removal and harmonic-source encoding", 70th EAGE Conference and Exhibition, Jun. 9-12, 2008, Rome, Italy, submission No. 3784.

Zhang et al., "Reverse-time migration: amplitude and implementation issues", SEG Annual Meeting, Sep. 23-28, 2007, San Antonio.

Zhang et al., "Sampling Issues in Delayed-Shot Migration and Plane-Wave Migration", EAGE 68th Conference and Exhibition, Jun. 12-15, 2006, Vienna, Austria.

International Search Report and Written Opinion mailed Dec. 20, 2011 in related Application No. PCT/EP2011/062815.

L. Amundsen, "Wavenumber-Based Filtering of Marine Point-Source Data", Geophysics, Sep. 1993, pp. 1335-1348, vol. 58, No. 9, Society of Exploration Geophysicists.

R. Bale, "Plane Wave Deghosting of Hydrophone and Geophone OBC Data", SEG Expanded Abstracts, 1998, Society of Exploration Geophysicists.

C. Lacombe, "Correcting for Water-Column Variations", The Leading Edge, Special Section: Statics, Feb. 2009, pp. 198-201.

Danish Patent and Trademark Office, Singapore Written Opinion in related Application No. 201300629-1, dated Jul. 22, 2015 (Copies of the citations D1 and D2 were provided with the IDS filed Oct. 17, 2014).

Singapore Examination Report in related Application No. 2013006291, dated Dec. 23, 2015.

* cited by examiner

3-D HARMONIC-SOURCE REVERSE TIME MIGRATION SYSTEMS AND METHODS FOR SEISMIC DATA ANALYSIS

CROSS REFERENCE TO RELATED APPLICATION

The present application is a continuation of U.S. patent application Ser. No. 13/190,758 filed on Jul. 26, 2011, which claims priority from U.S. Provisional Application No. 61/368,456 filed on Jul. 28, 2010, the entire contents of which are hereby incorporated by reference into the present application.

TECHNICAL FIELD

The present disclosure relates generally to geophysics and, in particular, methods and systems for seismic data analysis. More specifically, the present disclosure concerns using 3-D harmonic source reverse time migration.

BACKGROUND OF THE INVENTION

In the oil and gas industry, one widely used technique to search for oil and/or gas is to conduct seismic surveys to study subsurface formations. Typically, in seismic surveys, geophysicists use "seismic reflection" techniques to produce an image of the subsurface formations. These techniques generally involve emitting acoustic signals from a seismic energy source that propagate into the earth and recording the signals that are at least partially reflected by the layers of the subsurface formation that have different acoustic impedances. The acoustic waves reflected toward the surface are recorded as a function of time by the receivers. The signals recorded by the receivers are often called seismic traces.

Seismic data can be obtained in marine or land operations and the equipment used in each situation varies depending on the needs of the operation. Generally, the receivers used in seismic surveying include hydrophones and geophones. A hydrophone is a pressure-sensitive seismic detector that is typically used as receivers in marine seismic data acquisition because it enables recording of acoustic energy underwater by converting acoustic energy into electrical energy. Most hydrophones are based on a piezoelectric transducer that generates electricity when subjected to a pressure change. Such piezoelectric materials, or transducers, can convert a sound signal into an electrical signal.

A geophone is a velocity-sensitive seismic detector that is typically used as receivers in land or marine seismic data acquisition because it converts movement, e.g., displacement, into electrical energy—voltage, which may be recorded. Geophones have historically been passive analog devices and typically comprise a spring-mounted magnetic mass moving within a wire coil to generate an electrical signal. For land acquisition, the geophone contacts the ground and thus, its magnet, as the Earth moves, moves up and down around the mass. The magnetic field of this moving magnet produces an electrical voltage in the wire. The response of a coil/magnet geophone is proportional to ground velocity.

Once the seismic traces are acquired, various processing techniques are conventionally applied to these traces to improve the signal to noise ratio and facilitate their interpretation to provide a model of the subsurface formation. These processing techniques are applied to seismic traces with the goal of producing detailed and accurate models for use in interpreting subsurface geologic structures. Such detailed and accurate models are important in various fields. Specifically in the oil and gas industry, they are generally used for reservoir characterization, such as lithology, fluid prediction, and pore pressure prediction, as well as reservoir volume estimation.

Typically, processing of seismic traces (raw data) begins with deconvolution and other processes, which often improves temporal resolution by collapsing the seismic wavelet to approximately a spike and suppressing reverberations on some field data and remove noise. Migration is typically performed towards the end of the processing sequence. Migration generally corrects and improves initial assumptions that the surveyed formation contains near-horizontal layers. Particularly, seismic migration attempts to model actual geophysical characteristics of the formation, which can include dips, discontinuities, and curvature of the formation. Seismic migration typically occurs towards the end of the image processing of seismic traces. Further, migration generally moves dipping reflections to their true subsurface positions and collapses diffractions. As such, the process of migration is an imaging process that yields a seismic image of the subsurface. Migration can be performed before or after the stacking of the traces. Typically, there are two types of seismic migration: time migration and depth migration. The type depends on whether the output traces are represented according to the time or the depth.

Further, current migration methods do not have the capability to address complex non-horizontal features of the formation, including steeply dipping reflectors such as salt flanks. For instance, standard wave equation techniques used in conventional migration methods utilize mathematical approximations that assume wavefields propagate in only one direction. These techniques become inapplicable for complex situations because the integrity of these wave equation approximations breaks down as the dip angle goes beyond 70 degrees. One way of overcoming the limitations of the current state of the art of seismic migration is to apply reverse time migration (RTM) to the seismic data. RTM can handle complex wave velocities to produce all kinds of acoustic waves, such as reflections, refractions, diffractions, multiples, evanescent waves. Further, it can correct propagation amplitude and imposes no dip limitations on the image.

Because RTM enables structures with complex features to be properly imaged, RTM is a useful tool to address the complex non-horizontal features of a particular formation. In theory, RTM provides a more accurate model of the subsurface formations. In practice, however, RTM requires significantly more computational power than other techniques, which can be very costly, especially when applied to a TTI (Tilted Transverse Isotropy) project. As such, the cost to run the RTM algorithms may, often times, outweigh the benefits that RTM processing provides.

Typically, RTM inputs comprises: an initial inversion of the medium to be analyzed, a wavelet, and the set of recorded acoustic wave pressure traces. Generally, RTM simulates, in mathematical terms, the propagation of the acoustic wave in the medium being analyzed. During the simulation, the first step begins with exciting the medium by introducing a wavelet, or a shot, which can be expressed as a function of frequency and time. Then, RTM mathematically simulates wave propagation (forward propagation) by using an acoustic wave equation. Then, RTM repeats these steps in reverse, where it begins with the data recorded by the receivers and propagates the wave field back in time (backward propagation). When both fields representing the forward and backward propagations are available, the last step is to cross-correlate the two propagations to generate the output image.

The current state of the art is to use the known two-way acoustic wave equation of:

$$\frac{1}{c^2}\frac{\partial^2 u}{\partial t^2} = \nabla^2 u + s$$

where:
u=u(x,y,z,t) and is the pressure field,
c=c(x,y,z) and is the velocity field, and
s=s(x,y,z,t) is the source term.

There are, however, disadvantages to applying RTM to seismic traces using the conventional two-way acoustic wave equation. One of the disadvantages is the amount of computational power required to apply such algorithms. Other known methods such as phase encoding and delayed-shot migration and plane-wave migration do not address these problems as phase encoding is dependent on stacking power to remove the cross-talk artifacts and the delayed-shot and plane wave migration methods required expensive computation for RTM.

The novel approach of the present invention overcomes these problems associated with methods known in the art. For example, the present invention introduces a phase-encoding algorithm, harmonic source migration, that is generalized to a 3-D harmonic-source migration. The introduction of the "harmonic-source" phase encoding harmonic source migration improves the efficiency of the RTM method without compromising the processed data quality, thereby reducing computational costs, by reducing the number of shots, and hence the project cycle time and cost. In addition, by generalizing it to 3D harmonic-source migration, the requirement that all the sources are along a straight line is eliminated. Instead, the present invention—3D harmonic-source reverse time migration—only requires that all the sources and receivers are on a flat plane. This requirement is generally satisfied by most streamer acquisition in marine seismic surveys. The present invention can be used with other marine and seismic surveying methods that meet this requirement, and is not limited to only data from streamer acquisition.

Further, the 3D harmonic-source migration provided by the claimed invention is more appropriate for current wide-azimuth or multi-azimuth acquisitions, while 2D harmonic-source migration mainly fits to narrow azimuth migration. Also, a 3D harmonic-source migration allows for adjusting of sources and receivers to generate artificial sources (split spread), and migrating them altogether to obtain superior image without additional cost. In addition, for each 3D harmonic-source migration, the image produced can cover the whole area that has been surveyed and provides a full line migration aperture. On the other hand, for other known migration techniques such as common-shot migration, the migration aperture is limited in both directions and may fail to image the dipping events in far offsets.

In view of the drawbacks of methods known in the art, there is a great need for systems and methods that provide efficient and cost effective reverse time migration of seismic data. The present disclosure provides for improved methods and systems that produce high quality reverse time migration data without reduced computational costs and time.

BRIEF SUMMARY OF THE INVENTION

One object of the invention is to provide enhanced systems and methods for performing RTM analysis of seismic data.

To meet the above objective, there is provided, in accordance with one aspect of the invention, a method for processing seismic traces to produce an image of a subsurface area. The method includes the steps of applying a 3D phase encoding function to a series of seismic traces, at least a portion of the seismic traces include signals reflected by geological interfaces of a subsurface area, and the signals are recorded by one or more seismic receivers; computing a forward wavefield for one or more modeled shots of the seismic traces by solving a first two-wave equation, where the first two-wave equation is modified to include the phase-encoding algorithm; computing a backward wavefield for data recorded by the one or more receivers by solving a second two-way wave equation, where the second two-wave equation is modified to include the phase-encoding algorithm. The phase-encoding algorithm implements the phase shifts in the time domain. The steps of the method also includes rendering at least one image of the subsurface area by applying a cross-correlation imaging condition and summing the computed forward and backward wavefields to obtain a stacked image.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
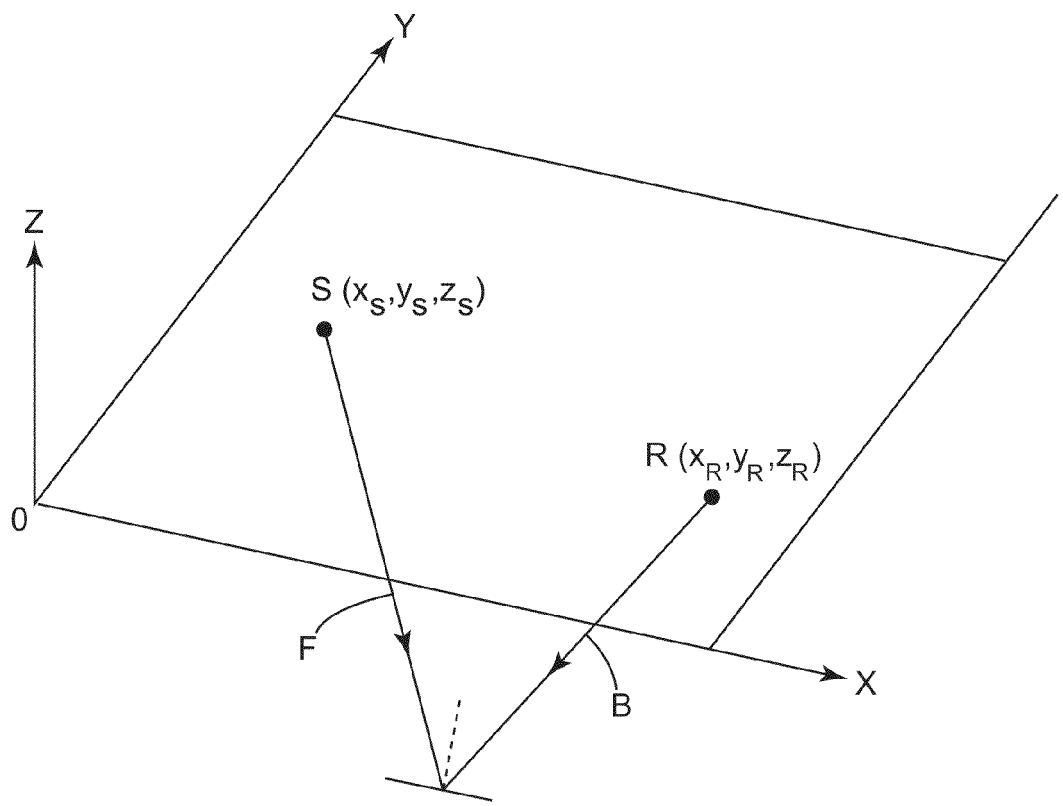
FIG. 1 illustrates a source, receiver and a reflected wave recorded by the receiver according to an exemplary embodiment.

The present disclosure is directed to a method and system for efficiently providing high quality seismic data processing using 3-D harmonic-source reverse time migration. Further, the various embodiments of the present invention can be implemented via computer-executable instructions, various elements of embodiments of the present invention are in essence the software code defining the operations of such various elements. Also, the embodiments of the present invention may be implemented in a controller or processor as will be discussed later. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Seismic data is generally displayed in the form of a time coordinate versus space coordinate. For shot records, the space coordinate represents the distance along a straight line from the position of the source of seismic energy, e.g., a shot, to the position of each receiver in plurality. The time coordinate indicates the time elapsed from activation of the shot to the detection of motion at each receiver position.

Reflection seismology depends upon the fact that a subsurface object will reflect, refract, or diffract the source signal back to the receiver with each receiver receiving and generating a reflected, refracted, or diffracted signal that is unique to the receiver's position. Generally speaking, one may substitute terms "common-receiver" or "common-endpoint" for common-source or "common-shot."

To reduce the number of shots that need to be migrated, the shots can be combined by line-source synthesis in the inline direction (delayed-shot migration) or in both inline and crossline directions (plane-wave migration). The delayed-shot migration approach requires all the sources to be along a straight line, which can be inconvenient. Further, the shots are not guaranteed to be aligned along a straight line in real acquisition, especially in a multi-azimuth project because the traces are acquired from different acquisition directions. Consequently, the data need to be regularized to make sure all the sources are lined up along the same direction. This kind of pre-processing step that may be necessary in delayed-shot migration causes inaccuracies in the imaging step. One way the claimed invention reduces the cost is by allowing more shots to be combined accurately, thereby reducing the number of shots that have to be migrated and hence reduced computation costs. Further, each migration of the claimed invention has a full survey aperture such that when the subsurface formation is not complicated, a few 3D harmonic-source migrations are sufficient to provide adequate imaging of the whole survey. Additional discussion is provided in Zhang et al., 2007, Reverse-time migration: amplitude and implementation issues, SEG/San Antonio 2007 Annual Meeting and Soubaras, 2006, Modulated-shot migration, SEG/New Orleans 2006 Annual Meeting, the disclosures of which are incorporated by reference as if they are fully set forth herein.

If the shots are combined in both the inline and crossline directions, one requirement is that all the sources and receivers are on a flat plane. This requirement can be easily met by seismic data acquired with common seismic surveying methods, such as streamer acquisition.

For a plane wave migration, a composite shot can be built by applying linear time delays, each corresponding to a p value, to the original shots; thus, obtaining a gather indexed in p, where $$p = \frac{\sin(\theta)}{v},$$

$\theta$ being the propagation angle of the synthesized plane-wave source with the vertical and v the velocity. The reduction of required computational comes from using less p values than the number of original shots while a sufficient amount of p values are used to produce satisfactory results.

Typically, RTM is performed in the time domain, so the plane-wave RTM would require a long time padding for data with long sail lines and large p values. The long padding time can slow down the process considerably and require substantial computational power. Other migration techniques, e.g., one-way wave equation migration, are performed in the frequency domain, where the time delays in plane-wave migration can be implemented as phase shifts thereby avoiding the need for time padding of the input traces. As mentioned above, because RTM is performed in the time domain, the time padding problem need to be addressed to increase computing efficiency. According to an exemplary embodiment a phase-encoding algorithm is used with a harmonic-source migration, to implement the phase shifts in the time domain. In one embodiment, a shot record can be represented as $Q(x_r, y_r; x_s, y_s; t)$ where the shot is at $(x_s, y_s, z_s=0)$ and the receivers are at $(x_r, y_r, z_r=0)$ as show in FIG. 1.

For 3D harmonic source migration, the phase encoding formulation in the time domain is $$h_{3D}(x_r,y_r;k_x,k_y;t) = \int \hat{Q}(x_r,y_r;x_s,y_s;\omega) e^{i\,sgn(\omega)(k_x x_s + k_y y_s)} e^{i\omega t} d\omega dx_s dy_s$$

where:
$\hat{Q}(x_r,y_r; x_s,y_s;\omega)$ is the acquired seismic data indexed by shot and receiver locations;
$\omega$ is the circular frequency; and
$k_x$ and $k_y$ are wavenumbers in x and y, respectively The phase encoding function is the function used to blend the phase of seismic data in frequency domain or to weight the data in time domain. For the 3D harmonic-source migration, the phase encoding function in frequency domain is $$e^{i\,sgn(\omega)(k_s x_s + k_y y_s)} e^{i\omega t}.$$

In time domain the equivalent 3D phase encoding function is $$\cos(k_x x_s + k_y y_s)\delta(t) - \sin(k_s x_s + k_y y_s)\frac{2}{t}.$$

Figure 2:
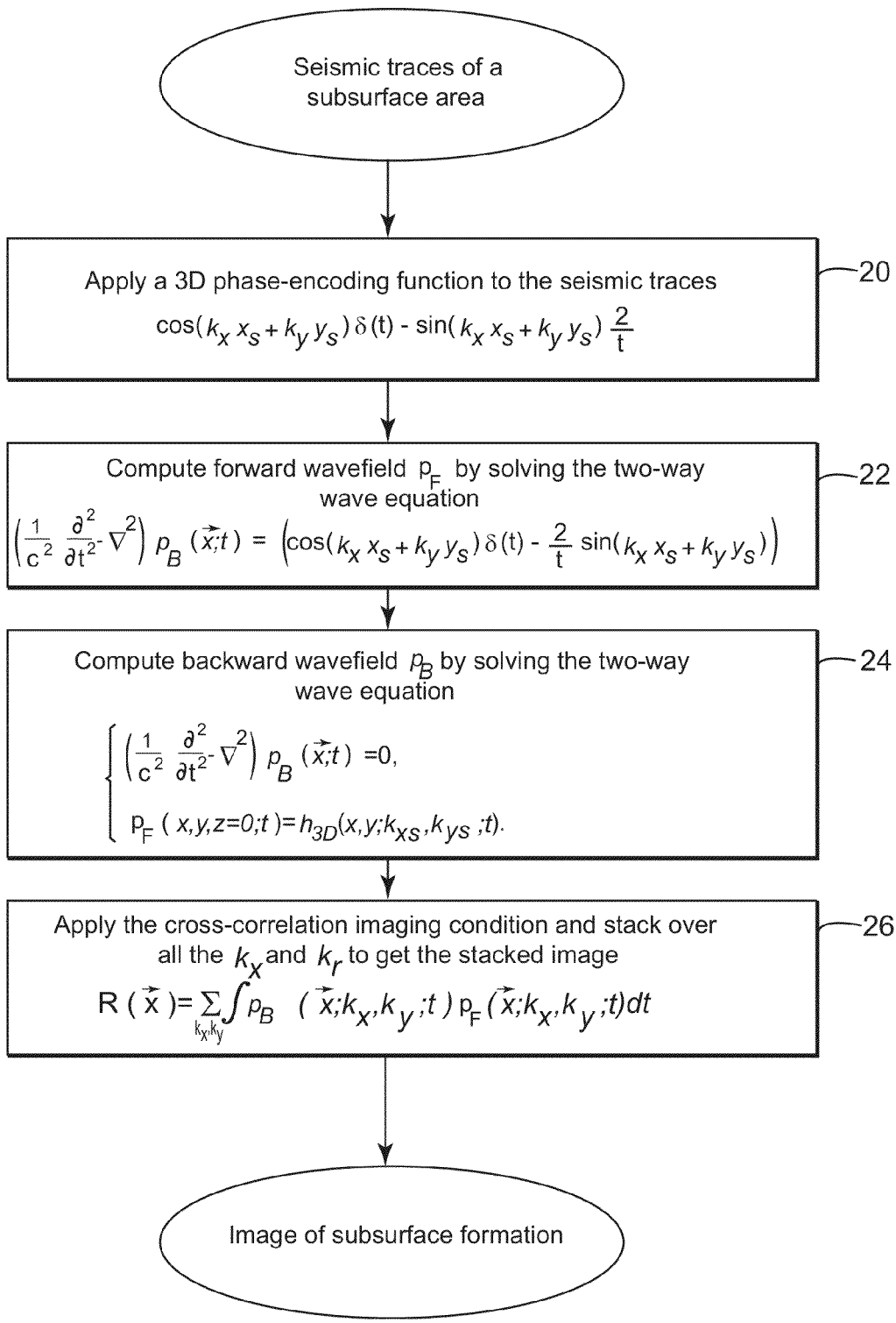
FIG. 2 illustrates a process for determining an image of a subsurface according to an exemplary embodiment.

Referring to FIG. 2, preferably, the 3D harmonic-source reverse time migration can be performed by the following steps. As seen in step 20, the seismic traces input is phase encoded with a phase encoding function. The phase encoding function may be $$\cos(k_x x_s + k_y y_s)\delta(t) - \sin(k_s x_s + k_y y_s)\frac{2}{t}.$$

However, other phase encoding functions may be used. Next, in step 22, the forward wavefield $p_F$ can be obtained by solving the following two-way wave equation that has been modified by the present invention to include the phase-encoding algorithm:

$$\left(\frac{1}{c^2}\frac{\partial^2}{\partial t^2} - \nabla^2\right)p_F(\vec{x};t) = \qquad (1)$$

$$\left(\cos(k_x x_s + k_y y_s)\partial(t) - \frac{2}{t}\sin(k_x x_s + k_y y_s)\right)\partial(z).$$

Obtaining the forward wavefield involves mathematically simulating a wave propagation (forward propagation direction F) using the two-way wave equation provided above that includes the phase-encoding algorithm. That is, the forward extrapolation of a modeled source wavefield for each harmonic source using the above equation (1) is performed and the wavefield at each time step is saved for later application of the imaging condition. The number of harmonic sources is usually much smaller than the number actual shot locations. In one embodiment, this number can be reduced through known methods such as an analysis similar to the determination of the number of p's in a delayed-shot migration. Such methods are provided by Zhang et al., 2006a, Sampling issues in delayed-shot migration and common-shot migration: 68th Annual International Meeting, EAGE, Extended Abstracts and Zhang et al., 2005a, Delayed-shot 3-D prestack depth migration: Geophysics, 70, no. 5, E21-E28, the disclosures of which are incorporated by reference as if they are fully set forth herein.

Next, the backward wavefield $p_B$ is determined in step 24 by solving the following two-way wave equation, also modified to include the phase-encoding algorithm:

$$\left(\frac{1}{c^2}\frac{\partial^2}{\partial t^2} - \nabla^2\right)p_B(\vec{x};t) = 0 \qquad (2)$$

and $$p_F(x, y, z = 0; t) = h_{3D}(x, y; k_{xs}k_{ys}; t).$$

Determining the backward wavefield involves a backward propagation (backward propagation direction B in FIG. 1) where the starting point is the data recorded by the receivers, and the wavefields are propagated back in time based on the two-way wave equation (2) provided above. The number of wavefields propagated back in time has been determined by the number of wavefields involved in the forward propagation.

When both fields representing the forward and backward propagation are available, a cross-correlation between them is performed to generate the output image in step 26. That is, at each time step, the corresponding source and receiver wavefields are correlated by applying the imaging condition. As such, the final wavefield in the forward propagation of the source is correlated with the initial wavefield in the backward propagation of the receiver. Subsequently, the results are summed to form a partial image volume for each shot, and the image volumes for consecutive shot gathers are spatially summed to produce the final pre-stack depth image. Preferably, the application of the cross-correlation imaging condition and stack over all the $k_x$ and $k_y$ to get the stacked image is pursuant to the following equation.

$$R(\vec{x}) = \sum_{k_x,k_y} \int p_B(\vec{x}, k_x, k_y; t) p_F(\vec{x}, k_x, k_y; t) dt.$$

As applied, the phase encoding in the time domain provides for negligible time padding requirements during the spatial transform, thereby saving time and computation costs. Further, as mentioned above, the computation costs can be further reduced because the number of wavefields required in the propagation can be reduced in the claimed invention.

Figure 3:
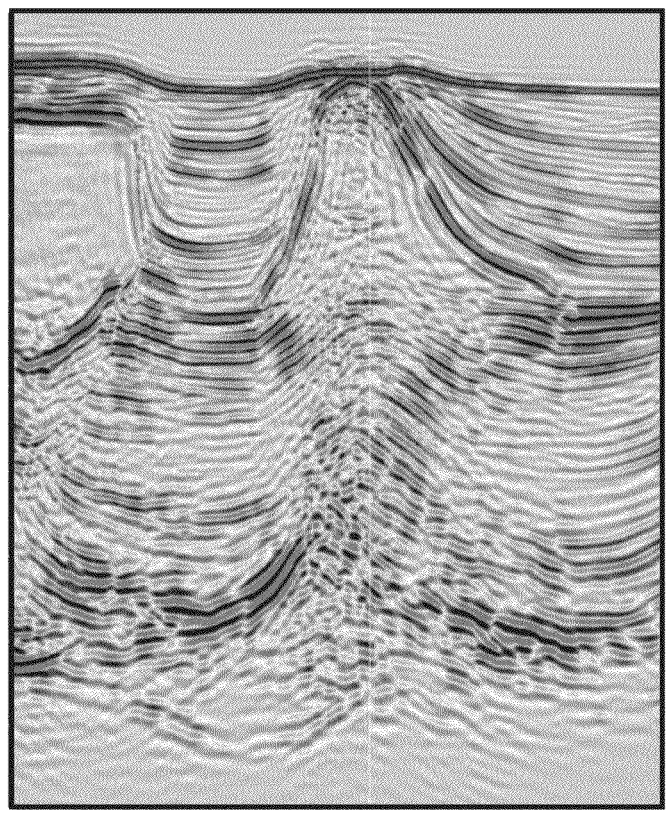
FIG. 3 illustrates the image output from the application of one embodiment of the present invention.
Figure 4:
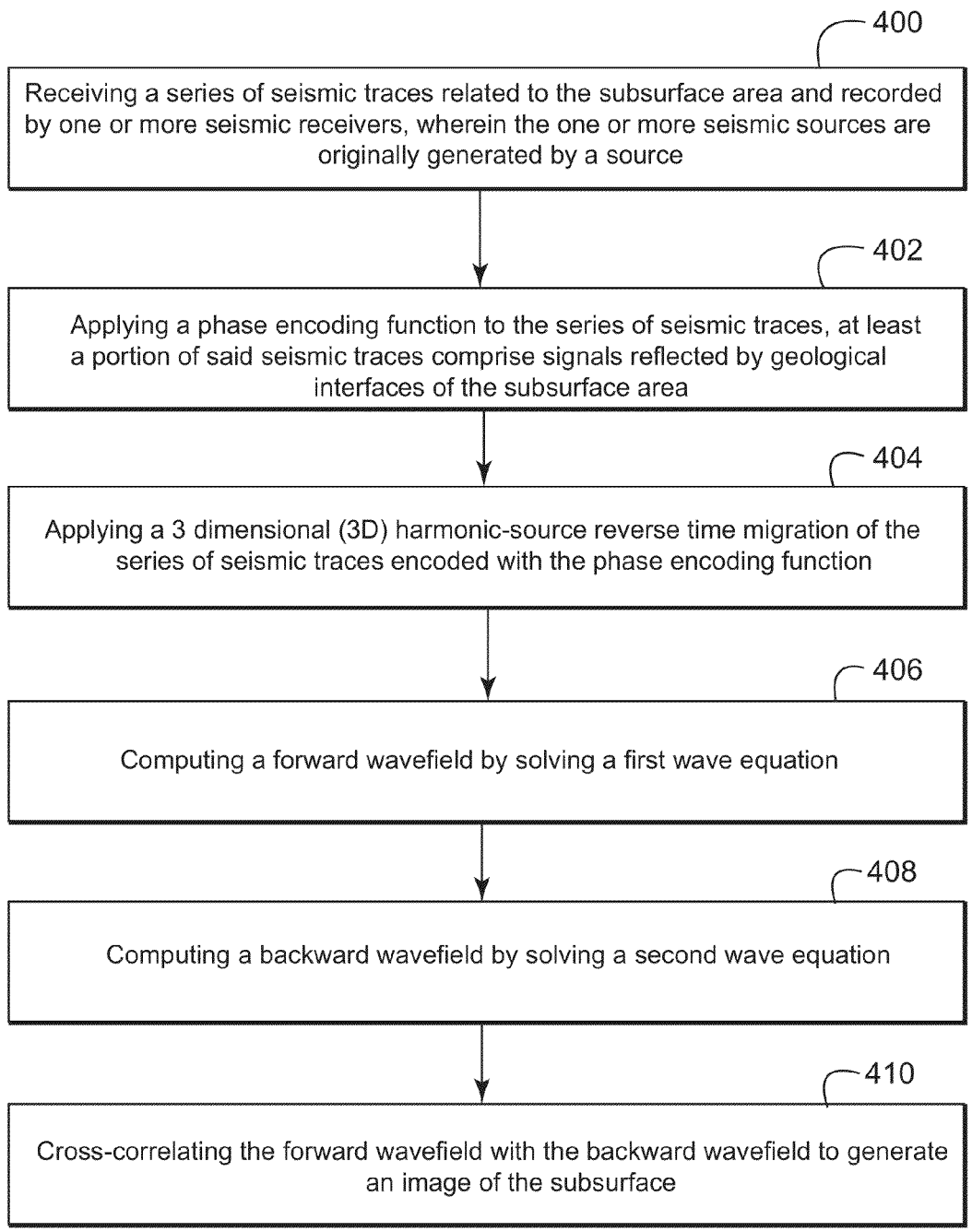
FIG. 4 is a flow chart of a method for determining the image of the subsurface according to an exemplary embodiment.

FIG. 3 illustrates a sample of the image output of the present invention as applied. After processing seismic data traces, the image provides various useful characteristics of a formation, such as fractures, stress, and lithology. A method used to provide the results illustrated in FIG. 3 is now discussed. According to an exemplary embodiment illustrated in FIG. 4, there is a method for processing seismic traces to produce an image of a subsurface area. The method includes a step 400 of receiving a series of seismic traces related to the subsurface area and recorded by one or more seismic receivers, wherein the one or more seismic sources are originally generated by a source; a step 402 of applying a phase encoding function to the series of seismic traces, at least a portion of said seismic traces comprise signals reflected by geological interfaces of the subsurface area; a step 404 of applying a 3 dimensional (3D) harmonic-source reverse time migration of the series of seismic traces encoded with the phase encoding function; a step 406 of computing a forward wavefield by solving a first wave equation; a step 408 of computing a backward wavefield by solving a second wave equation; and a step 410 of cross-correlating the forward wavefield with the backward wavefield to generate an image of the subsurface.

Figure 5:
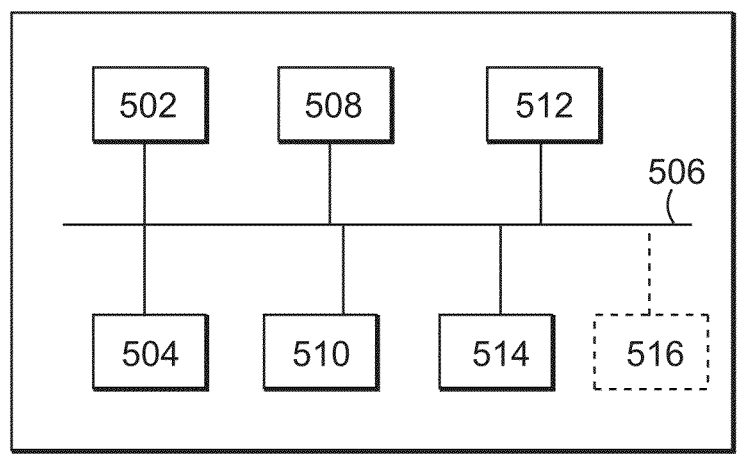
FIG. 5 illustrates a computing device that may perform the method of FIG. 4.

The embodiments of the systems of the present invention may include one or more computer systems to implement the various methods of the present invention. One exemplary computer system 500, as illustrated in FIG. 5, may include a central processing unit (CPU) 502, which may be any general-purpose CPU. The present invention is not restricted by the architecture of the CPU or other components of the systems of the present invention as long as the CPU and other components support the inventive operations as described herein. The CPU may execute the various logical instructions according to embodiments of the present invention. For example, the CPU may execute the calculation of the principal stresses according to the exemplary operational flows described above.

In addition, the exemplary computer system may also include random access memory (RAM) 504, which may be SRAM, DRAM, SDRAM, or the like. The embodiments may also include read-only memory (ROM) which may be PROM, EPROM, EEPROM, or the like. The RAM and ROM hold user and system data and programs, as is well known in the art. The memory 504 communicates with the CPU 502 through a bus 506.

The exemplary computer system also includes input/output (I/O) adapter 508, communications adapter 510, user interface adapter 512, and display adapter 514. I/O adapter, user interface adapter, and/or communications adapter may, in certain embodiments, enable a user to interact with the computer system in order to input information, e.g., seismic traces, and obtain output information that has been processed by the computer system.

The I/O adapter preferably connects to one or more storage device(s), such as one or more of hard drive, compact disc (CD) drive, floppy disk drive, tape drive, etc. to the exemplary computer system. The storage devices may be utilized when the RAM is insufficient for the memory requirements associated with storing data for operations of the elements described above (e.g., claim adjudication system, etc.). The communications adapter is preferably adapted to couple the computer system to a network, which may enable information to be input to and/or output from the computer system via the network (e.g., the Internet or other wide-area network, a local-area network, a public or private switched telephony network, a wireless network, any combination of the foregoing). The user interface adapter couples user input devices, such as keyboard, pointing device, and microphone and/or output devices, such as speaker(s) to the exemplary computer system. The display adapter is driven by the CPU to control the display on an optional display device 516, for example, the image output of migration according to the embodiments the claimed invention, such as that illustrated in FIG. 3.

It shall be appreciated that the present invention is not limited to the architecture of the exemplary computer system. For example, any suitable processor-based device may be utilized for implementing the various elements described above (e.g., software for presenting the user interfaces, claim adjudication system, etc.), including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing seismic traces to produce an image of a subsurface area, said method comprising:

receiving a series of seismic traces related to the subsurface area and recorded by one or more seismic receivers;

applying a 3 dimensional (3D) phase encoding function to the series of seismic traces to generate a 3D harmonic-source migration (h3D), wherein at least a portion of the series of seismic traces comprises signals reflected by geological interfaces of the subsurface area;

computing a forward wavefield based on the 3D phase encoding function;

computing a backward wavefield based on the 3D harmonic-source migration (h3D); and cross-correlating in a computing device the forward wavefield with the backward wavefield to generate an image of the subsurface.

2. The method of claim 1, wherein the 3D phase encoding function in the time domain is given by $$\cos(k_x x_s + k_y y_s)\delta(t) - \sin(k_x x_s + k_y y_s)\frac{2}{t},$$

where $k_x$ and $k_y$ are wavenumbers for axes X and Y, $x_s$ and $y_s$ are coordinates of a position of a source, t is a time when a wave generated by the source is recorded at a receiver, and $\delta$ is a delta function.

3. The method of claim 1, wherein the forward wavefield $p_F$ is computed by solving equation $$\left(\frac{1}{c^2}\frac{\partial^2}{\partial t^2} - \nabla^2\right) p_F(\vec{x}; t) = \left(\cos(k_x x_s + k_y y_s)\delta(t) - \frac{2}{t}\sin(k_x x_s + k_y y_s)\right)\delta(z),$$

where c is the speed of sound in the subsurface, $k_x$ and $k_y$ are wavenumbers for axes X and Y, $x_s$ and $y_s$ are coordinates of a position of a source, t is a time when a wave generated by the source is recorded at a receiver, z is a depth of the receiver, and $\delta$ is a delta function.

4. The method of claim 1, wherein the backward wavefield $p_b$ is computed by solving equation $$\left(\frac{1}{c^2}\frac{\partial^2}{\partial t^2} - \nabla^2\right) p_B(\vec{x}; t) = 0$$

and $$p_B(x, y, z=0; t) = h_{3D}(x, y; k_{xs} k_{ys}; t),$$

where c is the speed of sound in the subsurface, $h_{3D}$ is the 3D harmonic-source time-reverse migration, and t is the time.

5. The method of claim 4, wherein the $h_{3D}$ is given by $$h_{3D}(x_r, y_r; k_x, k_y; t) = \int \hat{Q}(x_r, y_r; x_s, y_s; \omega) e^{i\,sgn(\omega)(k_x x_s + k_y y_s)} e^{i\omega t} d\omega dx_s dy_s$$

where $\hat{Q}(x_r, y_r; x_s, y_s; \omega)$ is the acquired seismic data indexed by shot and receiver locations, $\omega$ is the frequency, $k_x$ and $k_y$ are wavenumbers in X and Y, respectively, and $e^{i\,sgn(\omega)(k_x x_s + k_y y_s)} e^{i\omega t}$ is the phase encoding function in the frequency domain.

6. The method of claim 1, further comprising:

rendering the image of said subsurface area according to the following equation $$R(\vec{x}) = \sum_{k_x, k_y} \int p_B(\vec{x}, k_x, k_y; t) p_F(\vec{x}, k_x, k_y; t) dt,$$

where R is the reflectivity of an interface in the subsurface area, $k_x$ and $k_y$ are wavenumbers on X and Y axes, $p_b$ is backward wavefield, $p_f$ is the forward wavefield, x is a spatial position and t is a corresponding time.

7. The method of claim 1, wherein the cross-correlation comprises:

correlating a final wavefield in a forward propagation of the source with an initial wavefield in the backward propagation of one receiver.

8. The method of claim 7, further comprising:
  summing results of the cross-correlation to form a partial image volume for each shot; and
  spatially summing image volumes for consecutive shot gathers are to produce a final pre-stack depth image.

9. A computing device for processing seismic traces to produce an image of a subsurface area, said computing device comprising:
  a processor configured to,
  receive a series of seismic traces related to the subsurface area and recorded by one or more seismic receivers;
  apply a 3 dimensional (3D) phase encoding function to the series of seismic traces to generate a 3D harmonic-source migration ($h_{3D}$), wherein at least a portion of the series of seismic traces comprises signals reflected by geological interfaces of the subsurface area;
  compute a forward wavefield based on the 3D phase encoding function;
  compute a backward wavefield based on the 3D harmonic-source migration ($h_{3D}$); and
  cross-correlate the forward wavefield with the backward wavefield to generate an image of the subsurface.

10. The computing device of claim 9, wherein the 3D phase encoding function in the time domain is given by $$\cos(k_x x_s + k_y y_s)\delta(t) - \sin(k_s x_s + k_y y_s)\frac{2}{t},$$

where $k_x$ and $k_y$ are wavenumbers for axes X and Y, $x_s$ and $y_s$ are coordinates of a position of a source, t is a time when a wave generated by the source is recorded at a receiver, and $\delta$ is a delta function.

11. The computing device of claim 9, wherein the forward wavefield pr is computed by solving equation $$\left(\frac{1}{c^2}\frac{\partial^2}{\partial t^2} - \nabla^2\right)p_F(\vec{x}; t) = \left(\cos(k_x x_s + k_y y_s)\delta(t) - \frac{2}{t}\sin(k_x x_s + k_y y_s)\right)\delta(z),$$

where c is the speed of sound in the subsurface, $k_x$ and $k_y$ are wavenumbers for axes X and Y, $x_s$ and $y_s$ are coordinates of a position of a source, t is a time when a wave generated by the source is recorded at a receiver, z is a depth of the receiver, and $\delta$ is a delta function.

12. The computing device of claim 9, wherein the backward wavefield $p_b$ is computed by solving equation $$\left(\frac{1}{c^2}\frac{\partial^2}{\partial t^2} - \nabla^2\right)p_B(\vec{x}; t) = 0$$

and $$p_B(x, y, z = 0; t) = h_{3D}(x, y; k_{xs}k_{ys}; t),$$

where c is the speed of sound in the subsurface, $h_{3D}$ is the 3D harmonic-source time-reverse migration, and t is the time.

13. The computing device of claim 12, wherein the $h_{3D}$ is given by $$h_{3D}(x_r, y_r; k_x, k_y; t) = \int \hat{Q}(x_r, y_r; x_s, y_s; \omega)e^{i\,sgn(\omega)(k_x x_s + k_y y_s)} e^{i\omega t} d\omega dx_s dy_s$$

where: $\hat{Q}(x_r, y_r; x_s, y_s; \omega)$ is the acquired seismic data indexed by shot and receiver locations, $\omega$ is the frequency, $k_x$ and $k_y$ are wavenumbers in X and Y, respectively, and $e^{i\,sgn(\omega)(k_x x_s + k_y y_s)} e^{i\omega t}$ is the phase encoding function in the frequency domain.

14. The computing device of claim 9, further comprising:
  rendering the image of said subsurface area according to the following equation $$R(\vec{x}) = \sum_{k_x, k_y} \int p_B(\vec{x}, k_x, k_y; t) p_F(\vec{x}, k_x, k_y; t) dt,$$

where R is the reflectivity of an interface in the subsurface area, $k_x$ and $k_y$ are wavenumbers on X and Y axes, $p_b$ is backward wavefield, $p_f$ is the forward wavefield, x is a spatial position and t is a corresponding time.

15. The computing device of claim 9, wherein the processor is configured to perform the cross-correlation by:
  correlating a final wavefield in a forward propagation of the source with an initial wavefield in the backward propagation of one receiver.

16. The computing device of claim 15, wherein the processor is further configured to:
  sum results of the cross-correlation to form a partial image volume for each shot; and
  spatially sum image volumes for consecutive shot gathers are to produce a final pre-stack depth image.

17. A non-transitory computer readable medium including computer executable instructions, wherein the instructions, when executed, implement a method for processing seismic traces to produce an image of a subsurface area, said method comprising:
  receiving a series of seismic traces related to the subsurface area and recorded by one or more seismic receivers;
  applying a 3 dimensional (3D) phase encoding function to the series of seismic traces to generate a 3D harmonic-source migration ($h_{3D}$), wherein at least a portion of the series of seismic traces comprises signals reflected by geological interfaces of the subsurface area;
  computing a forward wavefield based on the 3D phase encoding function;
  computing a backward wavefield based on the 3D harmonic-source migration ($h_{3D}$); and
  cross-correlating the forward wavefield with the backward wavefield to generate an image of the subsurface.

18. The medium of claim 17, wherein the 3D phase encoding function in the time domain is given by $$\cos(k_x x_s + k_y y_s)\delta(t) - \sin(k_s x_s + k_y y_s)\frac{2}{t},$$

where $k_x$ and $k_y$ are wavenumbers for axes X and Y, $x_s$ and $y_s$ are coordinates of a position of a source, t is a time when a wave generated by the source is recorded at a receiver, and $\delta$ is a delta function.

19. The medium of claim 17, wherein the forward wavefield $p_f$ is computed by solving equation $$\left(\frac{1}{c^2}\frac{\partial^2}{\partial t^2} - \nabla^2\right)p_F(\vec{x}; t) = \left(\cos(k_x x_s + k_y y_s)\delta(t) - \frac{2}{t}\sin(k_x x_s + k_y y_s)\right)\delta(z),$$

where c is the speed of sound in the subsurface, $k_x$ and $k_y$ are wavenumbers for axes X and Y, $x_s$ and $y_s$ are coordinates of a position of a source, t is a time when a wave generated by the source is recorded at a receiver, z is a depth of the receiver, and $\delta$ is a delta function.

20. The medium of claim 17, wherein the backward wavefield $p_b$ is computed by solving equation $$\left(\frac{1}{c^2}\frac{\partial^2}{\partial t^2} - \nabla^2\right) p_B(\vec{x}; t) = 0$$

and $$p_B(x, y, z = 0; t) = h_{3D}(x, y; k_{xs}k_{ys}; t),$$

where c is the speed of sound in the subsurface, $h_{3D}$ is the 3D harmonic-source time-reverse migration, and t is the time.

* * * * *